United States Patent [19]

Noda

[11] 4,222,537
[45] Sep. 16, 1980

[54] FISHING REEL

[75] Inventor: Hideo Noda, Sakai, Japan

[73] Assignee: Shimano Industrial Company, Limited, Osaka, Japan

[21] Appl. No.: 18,728

[22] Filed: Mar. 8, 1979

[30] Foreign Application Priority Data

Mar. 14, 1978 [JP] Japan .............................. 53-33065[U]

[51] Int. Cl.³ ............................................ A01K 89/00
[52] U.S. Cl. ................................... 242/212; 242/217
[58] Field of Search .............. 242/212, 213, 214, 215, 242/216, 84 R, 217; 254/186 HC

[56] References Cited

U.S. PATENT DOCUMENTS

| 3,315,913 | 4/1967 | Grieten ................................. 242/214 |
| 4,003,270 | 1/1977 | Moosberg ............................. 242/211 |
| 4,014,422 | 3/1977 | Morishita .............................. 242/212 |
| 4,130,251 | 12/1978 | Findley ............................ 242/84.1 R |

Primary Examiner—Billy S. Taylor
Attorney, Agent, or Firm—Stevens, Davis, Miller & Mosher

[57] ABSTRACT

A fishing reel including a spool shaft, which carries a spool, is journaled by a first and a second bearing between first and second side plates opposite to each other, and axially projects outwardly from the first side plate to carry a pinion in mesh with a master gear and in association selectively with the spool shaft, the pinion being provided with a tubular shaft carried through supporting means by a gear cover provided outwardly from the first side plate, so that the support means may support the rotating tubular shaft when the projection shaft is deflected, whereby the projection shaft is journaled through the supported tubular shaft.

4 Claims, 3 Drawing Figures

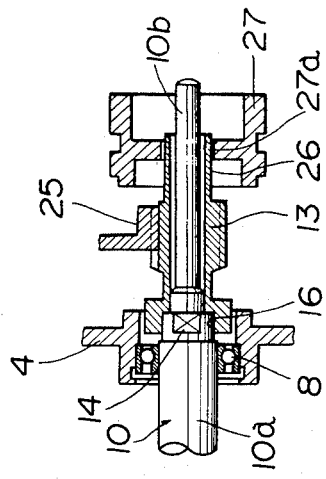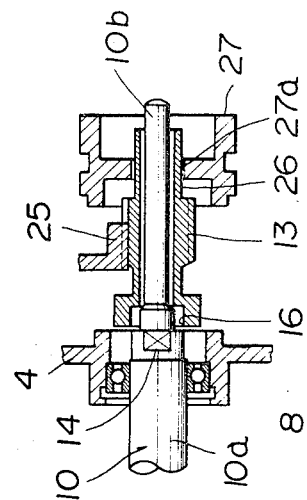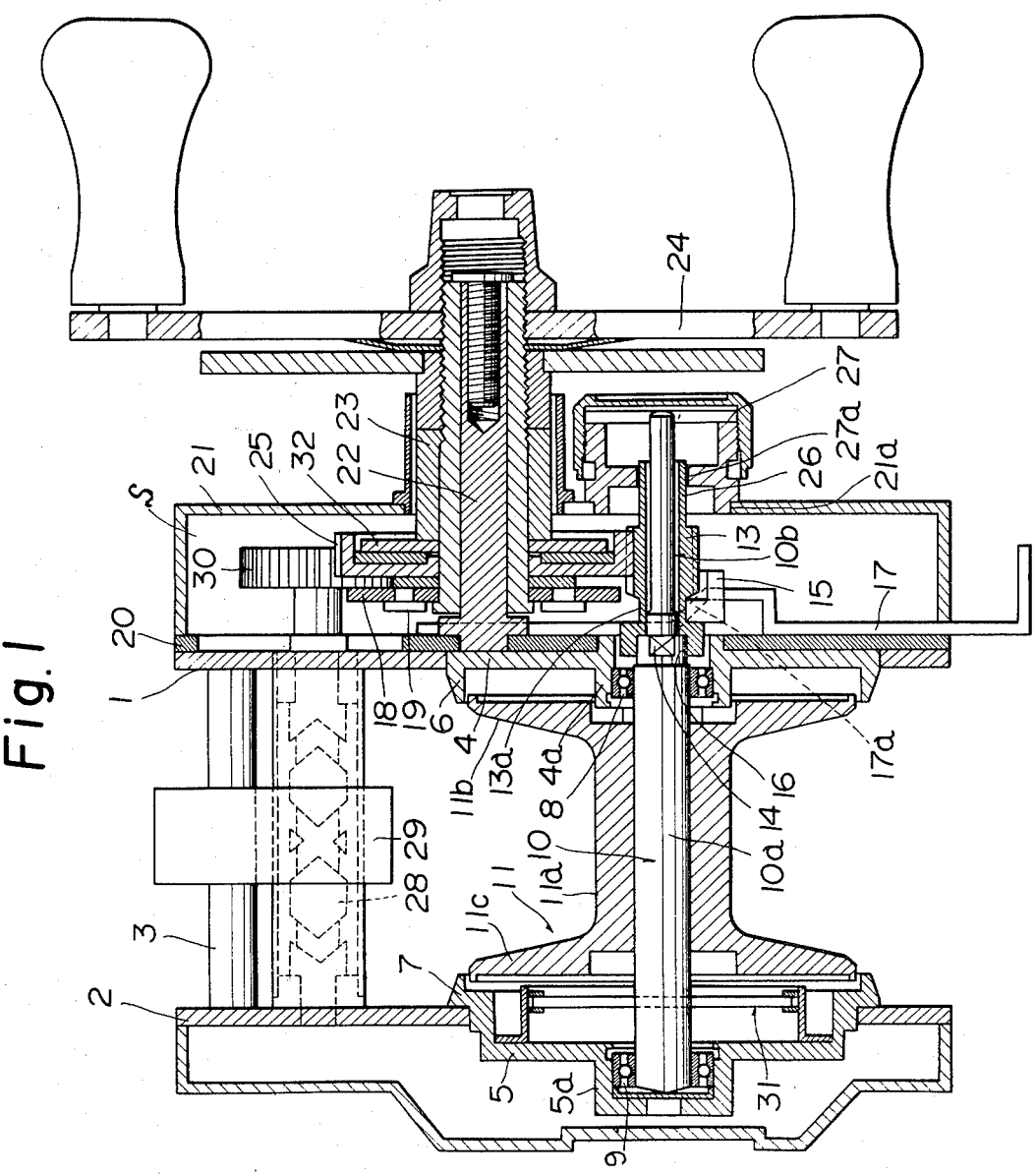

FISHING REEL

This invention relates to a fishing reel, and more particularly to a fishing reel in which a spool is disposed between a pair of a first and a second side plates opposite to each other and is carried by a spool shaft journaled at both axial ends thereof by a pair of bearing means.

Generally, this kind of fishing reel is known as the so-called double bearing reel and has been widely used. The fishing reel is adapted to transmit rotation of a handle bar from a master gear carried by a handle shaft to the spool shaft through a pinion slidably supported thereon, thereby rotating the spool fixed to the spool shaft so as to wind up a fishing line onto the spool. In other words, the spool shaft carrying at an intermediate portion thereof the pinion in relation of being axially movable, is supported at one end by one bearing provided at a gear cover.

Now, for the purpose of increasing the rotation speed of the spool shaft with respect to the turned handle bar so as to rapidly wind the fishing line onto the spool, a larger diameter master gear or smaller diameter pinion is used to increase the gear ratio therebetween. In this instance, the use of a larger diameter master gear leads to enlarging the reel as a whole, which is undesirable for an angler, while, the use of smaller diameter pinion should reduce the spool shaft diameter. Hence, there is the defect that excessive force applied to the fishing line, especially when fishing a hooked fish, causes a deflection at the spool shaft. As a result, flanges of the spool abut against the side plates or annular projections thereof, thereby increasing considerably the rotational resistance applied to the spool. In order to eliminate the above defect resulting from the use of the smaller diameter pinion, the bearings for the spool shaft are provided at the first and second side plates, the bearing at the first side plate journaling the spool shaft at a substantially intermediate portion thereof. Such a construction, when using a smaller diameter shaft for carrying the pinion, has the defect that the fishing line, when wound onto the spool, is subjected to a greater external force and, great torque is supplied to teeth in mesh at the master gear and pinion so as to produce deflection at the pinion carrying shaft, thereby causing the master gear and pinion to be poorly meshed with each other and so result in damage to teeth thereof.

In addition, the aforesaid defect is eliminated by the use of a third bearing for the foremost end of the smaller diameter shaft carrying the pinion, in which the spool shaft is journaled at three points. In this instance, it is difficult to arrange the three bearings at regular intervals to coincide at the axes with each other for machining, whereby the three-point journaling method is unpracticable.

In view of the aforesaid problems, this invention has been designed. An object of the invention is to provide a fishing reel which is, even when using the smaller diameter pinion for obtaining a greater gear ratio, capable of preventing deflection at the pinion carrying shaft of the spool shaft and/performing a smooth mesh of the pinion with the master gear to thereby ensure that the teeth of the master gear and pinion are not damaged.

The invention is characterized in that the spool shaft carrying the spool is journaled by a first and a second bearing between first and second side plates opposite to each other and axially projects outwardly from the first side plate to carry at the projection the pinion in mesh with the master gear and in association selectively with the spool shaft, the pinion being provided with a tubular shaft carried through support means to a gear cover attached outwardly from the first side plate, so that when deflection is produced at the projection shaft the support means may support the rotating tubular shaft, and the projection shaft is journaled by way of the supported tubular shaft.

The support means comprises a support having a through hole. Between the periphery of the through hole and the outer periphery of the tubular shaft is formed a gap to allow the pinion including the tubular shaft to be rotatable and axially slidable so that when a deflection is produced at the projection shaft the support means bears the tubular shaft through the periphery of the through hole.

The above and further objects and novel features of the invention will more fully appear from the following description of an embodiment thereof, taken in connection with the accompanying drawings, in which:

FIG. 1 is a longitudinally sectional view of an embodiment of the invention,

FIG. 2 represents the pinion carrying portion in section, and illustrates the pinion in association with the spool shaft, and FIG. 3 is an illustration showing the spool shaft in free rotation.

Referring to the drawings, reference numeral 1 indicates a first side plate and 2 indicates a second side plate, the side plates 1 and 2 being opposite to each other at a regular interval and connected by a plurality of rods 3 in the vicinity of the outer peripheries of the same.

At the central portions of first and second side plates 1 and 2 are provided a pair of support brackets 4 and 5 which are disc-like shaped and have at the centers bearing boxes 4a and 5a and the outer peripheries annular frames 6 and 7 extend axially inwardly of the brackets. The bearing boxes 4a and 5a house therein a first and a second bearing 8 and 9 respectively, so that a spool shaft 10 is journaled by the bearings 8 and 9.

The spool shaft 10 comprises a larger diameter shaft 10a and a smaller diameter shaft 10b, the larger diameter shaft 10a being journaled by the bearings 8 and 9 to fixedly support a spool 11. The smaller diameter shaft 10b projects axially outwardly from the first bearing 8 and carries a pinion 13 to be hereinafter described having a rotatable and axially slidable relationship. Between the larger diameter shaft 10a and the smaller diameter shaft 10b is provided a first engaging portion 14 constituting clutch means to be hereinafter described.

Between a plate 20 attached to the outer surface of the first side plate 1 and a gear cover 21 mounted outwardly from the first side plate 1 by way of the plate 20, is formed a space S within which the pinion and a master gear to be hereinafter described are disposed. A handle shaft 23 is supported by the plate 20 and gear cover 21 by way of a fixed shaft 22. The handle shaft 23 axially projects at one end thereof outwardly from the gear cover 21 to fix a handle bar 24 and carries at a substantially intermediate portion the master gear 25 which is rotatable. A friction board 32 adjacent to the master gear 25 is mounted to the handle shaft 23 in a non-rotatable relationship and axially movable only, so that rotation of the handle bar 23 may be transmitted to the master gear 25 by way of the friction board 32.

The spool 11 comprises a trunk 11a and disc-like shaped flanges 11b and 11c which are extending from both axial ends of the trunk 11a radially outwardly thereof. The flanges 11b and 11c are opposite at the outer peripheries thereof to the inner peripheries of the annular frames 6 and 7 and have outer diameters slightly smaller than the outer diameters of the annular frames 6 and 7 to form gaps therebetween, the gaps being narrow enough not to allow a fishing line to enter therein.

The pinion 13, which is carried by the smaller diameter projection shaft 10b at the spool shaft 10, has at the outer periphery an engaging groove 13a and is elastically biased always toward the spool 11 through a clutch 15 engageable with the groove 13a, which clutch is supported to the attached plate 20.

At an axial end of the pinion 13 at a side of the first side plate 1 a second engaging portion 16 is provided engageable with and disengageable from the first engaging portion 14 at the spool shaft 10, the engaging portions 14 and 16 constituting clutch means. The clutch means is coupled or disconnected by slidable motion of the pinion 13 controlled by control means.

The control means for slidably moving the pinion 13 comprises a control 17 which has a pusher 17a for pushing the clutch 15 axially outwardly of the spool shaft 10 and a return plate 18 which is fixed to the handle shaft 23 to serve to return the control 17. The control 17 is pushed to move the clutch 15 axially outwardly from the spool shaft to thereby move the pinion 13 in the direction of disconnecting the clutch means. While, the handle bar 24 is turned and clutch pins 19 projecting from the return plate 18 strike the utmost end of control 17 to thereby return the control 17. Then, the clutch 15 is released therefrom and biases the pinion 13 in the direction of coupling the clutch means.

The fishing reel of the invention is so constructed that the spool shaft 10 journaled by the first and second bearings 8 and 9 as aforegoing carries the pinion 13 at the smaller diameter projection 10b.

The smaller diameter projecting shaft 10b is made smaller in diameter to increase the gear ratio of the master gear 25 to pinion 13, and the pinion 13 is provided with a tubular shaft 26 at the opposite end to the second engaging portion 16, the tubular shaft 26 being supported by support means provided at the gear cover 21.

The support means is formed mainly of a support 27 which has at its center a through hole slightly larger in diameter than the tubular shaft 26, the through hole forming a tubular shaft supporting portion 27a.

A gap is formed between the periphery of the through hole of the supporting portion 27a and the outer periphery of tubular shaft 26, thereby allowing the pinion 13 including the tubular shaft 26 to be rotatable and axially slidable through the gap. Hence, the tubular shaft 26 is rotatable and axially slidable without contacting with the supporting portion 27a in normal use, but when the fishing line is subjected to an excessive load and deflection is produced at the projection shaft 10b, the tubular shaft 26 contacts with the supporting portion 27a and is rotatably supported therewith. As a result, the projection shaft 10b is journaled by the support 27 through the tubular shaft 26.

The gap is made narrow to the extent that the deflection produced at the projection shaft 10b is restrained from damaging the teeth in mesh at the master gear 25 and pinion 13 when subjected to the greater torque resulting from an excessive load applied to the fishing line.

In other words, the deflection at the projection shaft 10b is not fully restrained but is held within a limit of effecting the mesh for teeth at gears 25 and 13. Accordingly, the tubular shaft 26, when not subjected to excessive force, rotates or axially slides free from the supporting portion 27a, whereby a slight error in the dimension of the gap is negligible due to the lack of interference with the above rotation or sliding motion.

The support 27 also is mounted to an opening 21a at the gear cover 21 by press fit or welding, or may be integral with the gear cover 21.

In addition, in the drawings, reference numeral 28 indicates a guide shaft rotatably journaled between the first and second side plates 1 and 2; 29 indicates a fishing line guide carried by the guide shaft 28 and axially movable in reciprocation; 30 indicates a transmission gear in mesh with the master gear 25 to transmit rotation of the handle bar 24 to the guide shaft 28, and 31 indicates a brake device for the spool 11.

The fishing reel of the invention of the foregoing construction is operated in such a manner that the control plate 17 is pushed to axially move the clutch 15 and pinion 13, whereby the second engaging portion 16 is disengaged from the first engaging portion 14 as shown in FIG. 3 to allow the spool 11 to freely rotate, thus, casting the fishing line from the spool through a sinker at the line end. Alternatively, the handle bar 24 is turned to allow the clutch pins 19 at the return plate 18 to press the utmost end of control 17 to thereby return the control 17 and the clutch 15 is released therefrom to move the pinion 13, thereby engaging the second engaging portion 16 with the first engaging portion 14, thus transmitting the driving force from the handle bar 24 to the spool 11 for winding the fishing line thereon.

In a case where the fishing line, when wound onto the spool, is subjected to an excessive load, greater torque is applied to the teeth in mesh at the master gear 25 and pinion 13 so as to lead to deflection at the projection shaft 10b. The invention, however, makes it possible for the gear to bear the greater torque cover 21 through the tubular shaft 26 and support 27, thereby reliably preventing the projection shaft 10b from being deflected over the aforesaid limit due to the excessive torque.

As clearly understood from the aforesaid description, the fishing reel of the invention is so constructed that the pinion, which is carried by the projection shaft of the spool shaft, is provided with the tubular shaft, the tubular shaft being supported through the support means to the gear cover provided outwardly from the first side plate, whereby the projection shaft is journaled by the support means through the tubular shaft. Hence, even when using the smaller diameter pinion to increase the gear ratio thereof to the master gear, the projection shaft is reliably prevented from deflecting beyond the limit due to the excessive torque applied to the teeth in mesh at the master gear and pinion. Consequently, the master gear and pinion are free from damage to the teeth thereof.

Also, the projection shaft journaled through the pinion allows the spool shaft to rotate smoothly.

Furthermore, the projection shaft made smaller only in diameter is capable of reducing the frictional resistance applied to the moving pinion and rotational resistance applied to the spool in free rotation, thereby facilitating control of the pinion and further smoothly operating the spool in free rotation.

While the form of embodiment of the invention as herein described comprises a preferred form, it is to be understood that other forms might be adopted, all coming within the scope of the claims which follow.

What is claimed is:

1. A fishing reel comprising;
   (a) first and second side plates opposite to each other, said side plates being connected at a regular interval by a plurality of connecting rods, said first side plate having a first bearing, said second side plate having a second bearing;
   (b) a gear cover fixed outwardly from said first side plate, said gear cover and first side plate enclosing a space therebetween;
   (c) a handle shaft rotatably supported between said first side plate and said gear cover, said handle shaft projecting outwardly from said gear cover to form a projecting shaft portion, said projecting shaft portion carrying a handle bar;
   (d) a master gear carried by said handle shaft, said master gear being disposed within said space;
   (e) a spool shaft positioned between said first and second bearings and journaled therewith, said spool shaft projecting axially outwardly from said first bearing and penetrating through said space to form a projecting shaft portion, said projecting shaft portion having a first engaging portion;
   (f) a spool fixed to said spool shaft;
   (g) a pinion being supported to said projecting shaft portion at said spool shaft in a relationship of being slidable axially of said projecting shaft portion, said pinion being disposed within said space, meshed with said master gear, and having at one axial end a second engaging portion engageable with said first engaging portion and at the other axial end a tubular shaft;
   (h) control means for controlling said pinion in sliding motion;
   (i) support means being provided at said gear cover and having a supporting portion for supporting said tubular shaft, said supporting portion of said support means and said tubular shaft having a gap therebetween, said gap allowing said pinion including said tubular shaft to rotate and axially slide, said support means being adapted to bear said tubular shaft when deflection is produced at said projecting shaft portion of said spool shaft.

2. A fishing reel according to claim 1, wherein said support means comprises a support having a through hole of a diameter slightly larger than the outer diameter of said tubular shaft, so that when deflection is produced at said projecting shaft portion of said spool shaft said tubular shaft is brought into contact with said through hole, whereby said support means bears said projecting shaft portion of said spool shaft through said tubular shaft.

3. A fishing reel according to claim 2, wherein said support is integral with said gear cover.

4. A fishing reel according to claim 1, wherein said spool shaft comprises a larger diameter shaft portion and a smaller diameter shaft portion, said larger diameter shaft portion fixing therewith said spool and being journaled by said first and second bearings, said smaller diameter shaft portion serving as a projecting shaft portion to carry therewith said pinion.

* * * * *